United States Patent
Ishikawa (10) Patent No.: US 7,464,481 B2
(45) Date of Patent: Dec. 16, 2008

(54) MEASURING APPARATUS, METHOD OF MEASURING SURFACE TEXTURE AND COMPUTER READABLE MEDIUM HAVING PROGRAM FOR MEASURING SURFACE TEXTURE

(75) Inventor: Nobuhiro Ishikawa, Ibaraki (JP)

(73) Assignee: Mitutoyo Corporation, Kawasaki (JP)

( * ) Notice: Subject to any disclaimer, the term of this patent is extended or adjusted under 35 U.S.C. 154(b) by 66 days.

(21) Appl. No.: 11/802,856

(22) Filed: May 25, 2007

(65) Prior Publication Data

US 2007/0271803 A1    Nov. 29, 2007

(30) Foreign Application Priority Data

May 25, 2006  (JP) .............. 2006-145294

(51) Int. Cl.
    G01B 21/04   (2006.01)
    G01B 5/004   (2006.01)
(52) U.S. Cl. ........................... 33/503
(58) Field of Classification Search ............ 33/503
    See application file for complete search history.

(56) References Cited

U.S. PATENT DOCUMENTS

| | | | |
|---|---|---|---|
| 4,769,763 A * | 9/1988 | Trieb et al. .............. 702/168 |
| 5,048,194 A * | 9/1991 | McMurtry ................. 33/558 |
| 5,471,406 A * | 11/1995 | Breyer et al. ............. 702/168 |
| 5,579,246 A | 11/1996 | Ebersbach et al. |
| 5,979,070 A * | 11/1999 | Lau ........................... 33/559 |
| 6,044,569 A * | 4/2000 | Ogihara et al. ............. 33/503 |
| 2002/0029119 A1 | 3/2002 | Lotze et al. |
| 2005/0016008 A1* | 1/2005 | Raab et al. .................. 33/503 |
| 2008/0021672 A1* | 1/2008 | Powley et al. ............. 702/158 |
| 2008/0154527 A1* | 6/2008 | Staaden et al. .............. 702/95 |

FOREIGN PATENT DOCUMENTS

| | | |
|---|---|---|
| EP | 0 657 715 A2 | 6/1995 |
| JP | A-07-324928 | 12/1995 |
| JP | A-07-324929 | 12/1995 |
| WO | WO 00/42387 A1 | 7/2000 |
| WO | WO 02/04883 A1 | 1/2002 |

\* cited by examiner

*Primary Examiner*—Christopher W Fulton
(74) *Attorney, Agent, or Firm*—Oliff & Berridge, PLC (57) ABSTRACT

An arithmetic unit 212 is a correction filter 212a based on the relative displacement characteristics between a scale unit 19b and the end of a slider 16, and calculates a measured value by adding up together the displacement of the stylus tip 17a and a value found by applying the correction filter 212a to the displacement of the slider 16 detected by the scale unit 19b.

16 Claims, 6 Drawing Sheets

FIG. 8

MEASURING APPARATUS, METHOD OF MEASURING SURFACE TEXTURE AND COMPUTER READABLE MEDIUM HAVING PROGRAM FOR MEASURING SURFACE TEXTURE

This application claims priority to Japanese Patent Application No. 2006-145294, filed May 25, 2006, in the Japanese Patent Office. The priority application is incorporated by reference in its entirety.

TECHNICAL FIELD

The present disclosure relates to a measuring apparatus capable of correcting errors in the measurement when a measurement by scanning is taken by using a scanning probe, to a method of measuring surface texture and to a computer readable medium having a program for measuring surface texture.

RELATED ART

When a measurement is taken by using a scanning probe of a measuring apparatus, errors occur in the measurement being affected by the motion of the slider. For example, when a circle is measured by using the scanning probe, a kinetic error called quadrant projection occurs. The quadrant projection is a kinetic error that forms like a projection when a quadrant changes over (when the direction of motion is inverted on each axis) on the mechanical rectangular coordinates of a measuring machine while the scanning probe is undergoing a circular motion. A projection-like error occurs in the measurement due to the quadrant projection.

The quadrant projection is caused chiefly by backlash stemming from the mechanical structure of the measuring machine.

Figure 8:
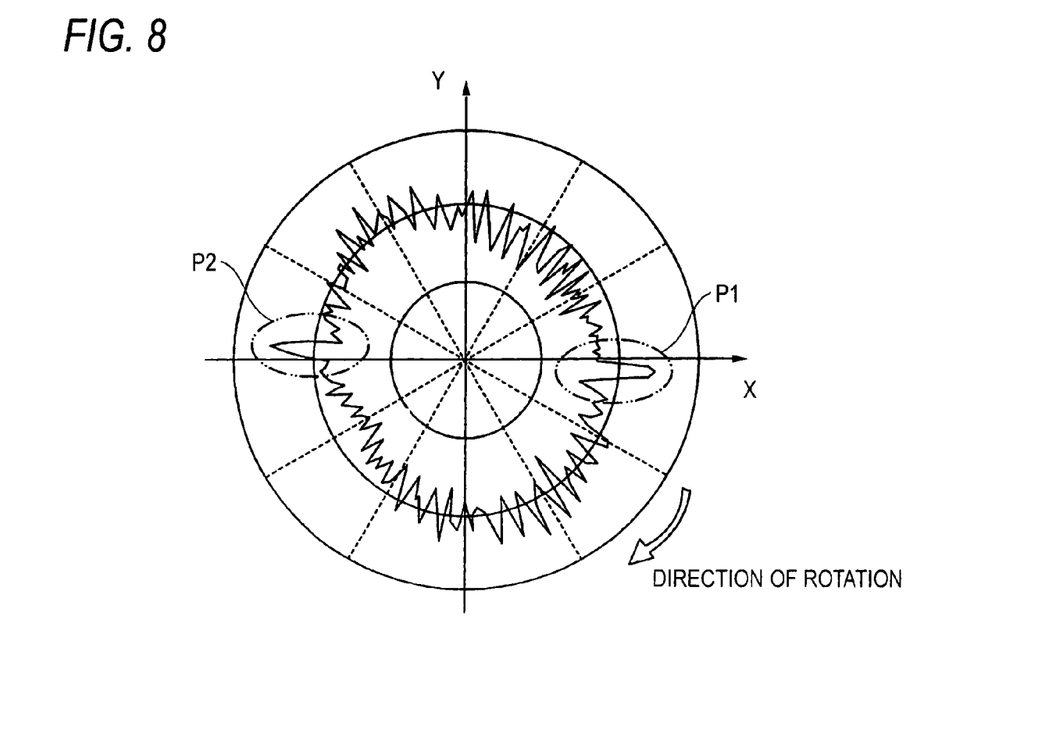
FIG. 8 is a diagram illustrating the measured values of the shape of an object to be measured in the case of using a related-art three-dimensional measuring apparatus.

FIG. 8 illustrates an example of measuring a ring gauge (ring-like object to be measured) by using a related-art three-dimensional measuring device. In the example of FIG. 8, a projection-like error is observed in the measurement at a boundary region P1 between the forth quadrant and the first quadrant, and at a boundary region P2 between the second quadrant and the third quadrant.

The following patent documents are disclosing the methods of correcting errors in the measurement using a scanning probe. For example, the patent document 1 (Japanese Patent Unexamined Publication No. 7-324928) eliminates the error caused by the action of force produced by the inertia of mass by storing a corrected value representing deflection characteristics of CMM as a function of the position of the measuring slider and the acceleration of the measuring slider. The patent document 2 (Japanese Patent Unexamined Publication No. 7-324929) discloses a constitution for calculating a corrected value from the force of measurement, acceleration and elastic bending characteristics of CMM.

However, only a portion of error in the measurement is removed by the constitution of the above measuring apparatuses, and various errors are still included in the measured value. For instance, it is probable that the error in the measurement includes the above projection-like error in the measurement.

Further, when the measuring slider is fed at a very low speed, a so-called stick-slip occurs depending upon the shape of the slide surface of the slider and the condition of lubrication. Accordingly, the measuring slider is not necessarily smoothly fed and, as a result, an error may occur in the measurement.

Further, according to the related art which corrects the action of force produced by the inertia of mass by expressing it as deflection characteristics based on the position and the acceleration of the measuring slider, a corrected value is obtained from only a relationship between the position/acceleration and the deflection characteristics. However, there may further occur an error due to transient abnormal vibration caused by resonance of the measuring slider as well as error caused by complex relative displacement characteristics (characteristics due to transient phenomena of displacement of the axes, particularly, when a measurement by scanning is taken by scanning the contour of the object to be measured) stemming from a dependent structure of the drive unit (e.g., dependent connection structure in which an X-axis guide is driven by a Y-axis slider, a Z-axis guide is driven by an X-axis slider, and a Z-axis slider supports a probe, see FIG. 1).

Therefore, it has been desired to further improve the measuring precision by completely correcting the error.

SUMMARY

An object of the present invention is to provide a measuring apparatus capable of highly precisely measuring an object to be measured by decreasing errors in the measurement, a method of measuring surface texture and a computer readable medium having a program for measuring surface texture.

A first measuring apparatus according to the invention comprises a scanning probe having, at an end thereof, an stylus tip that comes in contact with an object to be measured to take a measurement by scanning; a slider which is allowed to freely move supporting the scanning probe at an end thereof; a scale unit for detecting a displacement of the slider; an stylus tip displacement detector unit for detecting a displacement of the stylus tip of the scanning probe with respect to the end of the slider; and an arithmetic unit for calculating a measured value from the displacement of the slider detected by the scale unit and from the displacement of the stylus tip detected by the stylus tip displacement detector unit; wherein the arithmetic unit has a correction filter based on a relative displacement characteristics between the scale unit and the end of the slider, and calculates the measured value by adding up together the displacement of the stylus tip and a presumed value of displacement of the end of the slider found by applying the correction filter to the displacement of the slider detected by the scale unit.

Owing to the above constitution, the arithmetic unit calculates the measured value by using relative displacement characteristics between the scale unit and the end of the slider output through the correction filter. Therefore, error in the displacement decreases between the scale unit and the end of the slider, and the object to be measured can be measured highly precisely. The objects to be measured are, particularly, those of a circular shape in which the speed components of axes vary over a wide range, such as cylinders and pistons of the engines.

A second measuring apparatus according to the invention comprises a scanning probe having, at an end thereof, an stylus tip that comes in contact with an object to be measured to take a measurement by scanning; a slider which is allowed to freely move supporting the scanning probe at an end thereof; a scale unit for detecting a displacement of the slider; an stylus tip displacement detector unit for detecting a displacement of the stylus tip of the scanning probe with respect to the end of the slider; and an arithmetic unit for calculating a measured value from the displacement of the slider detected by the scale unit and from the displacement of the stylus tip detected by the stylus tip displacement detector unit; wherein the arithmetic unit has a correction filter based on a relative displacement characteristics between the scale unit and the end of the slider, and the arithmetic unit finds a kinetic error by subtracting a design value of the object to be measured from the displacement of the slider detected by the scale unit and calculates the measured value by adding up together a corrected value of the kinetic error found by applying the correction filter to the kinetic error, the design value and the displacement of the stylus tip.

Owing to the above constitution, the arithmetic unit subtracts the design value of the object to be measured from the displacement of the slider detected by the scale unit, and executes the processing through the correction filter. Therefore, a value (kinetic error) obtained by subtracting the design value of the object to be measured from the displacement of the slider detected by the scale unit, becomes very small compared to the design value. This very small value may be corrected. This makes it possible to effectively utilize the dynamic range (ratio of a minimum value and a maximum value that can be handled in the operation system) of operation of the correction filter and to realize a more precise correction.

A third measuring apparatus according to the invention comprises a scanning probe having, at an end thereof, an stylus tip that comes in contact with an object to be measured to take a measurement by scanning; a slider which is allowed to freely move supporting the scanning probe at an end thereof; a scale unit for detecting a displacement of the slider; an stylus tip displacement detector unit for detecting a displacement of the stylus tip of the scanning probe with respect to the end of the slider; and an arithmetic unit for calculating a measured value from the displacement of the slider detected by the scale unit and from the displacement of the stylus tip detected by the stylus tip displacement detector unit; wherein the arithmetic unit has a correction filter based on a relative displacement characteristics between the scale unit and the end of the slider, and the arithmetic unit finds a presumed value of design value of the object to be measured from the displacement of the slider detected by the scale unit and finds a presumed kinetic error by subtracting the presumed value of the design value from the displacement of the slider, and calculates the measured value by adding up together a corrected value of the presumed kinetic error found by applying the correction filter to the presumed kinetic error, the presumed value and the displacement of the stylus tip.

Owing to the above constitution, the arithmetic unit subtracts the presumed value of the shape of the object to be measured from the displacement of the slider detected by the scale unit, and executes the processing through the correction filter. Therefore, a value (presumed kinetic error) obtained by subtracting the presumed value of the object to be measured from the displacement of the slider detected by the scale unit, becomes very small compared to the presumed value. Therefore, this constitution, too, makes it possible to effectively utilize the dynamic range of operation of the correction filter and to realize a more precise correction.

The correction filter may be so constituted as to correct an input value based on a presumed value of frequency transfer characteristics of from the scale unit up to the end of the slider.

The frequency transfer characteristics are expressed by a transfer function determined for each position of the slider, and the presumed value of the frequency transfer characteristics is calculated based on the transfer function determined for each position of the slider.

The correction filter uses,
[Mathematical 1]

$$G_e = [\omega^2_P(S^2 + 2\xi_Z\omega_z S + \omega^2_Z)] / [\omega^2_Z(S^2 + 2\xi_P\omega_P S + \omega^2_P)]$$

where $G_e$: presumed value of a frequency transfer function,
S: Laplace operator,
$\omega_Z$: angular frequency at the zero,
$\omega_P$: angular frequency at the pole,
$\xi_Z$: attenuation factor at the zero,
$\xi_P$: attenuation factor at the pole, as an approximate function of the transfer function that represents the frequency transfer characteristics, applies it to the frequency transfer function that is measured, and outputs the approximate function as the presumed value of the frequency transfer characteristics.

A first method of measuring surface texture according to the invention is for measuring an object that is to be measured by using a measuring apparatus which comprises a scanning probe having, at an end thereof, an stylus tip that comes in contact with an object to be measured to take a measurement by scanning; a slider which is allowed to freely move supporting the scanning probe at an end thereof; a scale unit for detecting a displacement of the slider; an stylus tip displacement detector unit for detecting a displacement of the stylus tip of the scanning probe with respect to the end of the slider; and an arithmetic unit for calculating a measured value from the displacement of the slider detected by the scale unit and from the displacement of the stylus tip detected by the stylus tip displacement detector unit; the method of measuring surface texture comprising a step of calculating the measured value by adding up together the displacement of the stylus tip and a presumed value of displacement of the end of the slider found by applying a correction filter based on a relative displacement characteristics between the scale unit and the end of the slider to the displacement of the slider detected by the scale unit.

A second method of measuring surface texture according to the invention is for measuring an object that is to be measured by using a measuring apparatus which comprises a scanning probe having, at an end thereof, an stylus tip that comes in contact with an object to be measured to take a measurement by scanning; a slider which is allowed to freely move supporting the scanning probe at an end thereof; a scale unit for detecting a displacement of the slider; an stylus tip displacement detector unit for detecting a displacement of the stylus tip of the scanning probe with respect to the end of the slider; and an arithmetic unit for calculating a measured value from the displacement of the slider detected by the scale unit and from the displacement of the stylus tip detected by the stylus tip displacement detector unit; the method of measuring surface texture comprising a step of finding a kinetic error by subtracting a design value of the object to be measured from the displacement of the slider detected by the scale unit and calculating the measured value by adding up together a corrected value of the kinetic error found by applying a correction filter based on a relative displacement characteristics between the scale unit and the end of the slider to the kinetic error, the design value and the displacement of the stylus tip.

A third method of measuring surface texture according to the invention is for measuring an object that is to be measured by using a measuring apparatus which comprises a scanning probe having, at an end thereof, an stylus tip that comes in contact with an object to be measured to take a measurement by scanning; a slider which is allowed to freely move supporting the scanning probe at an end thereof; a scale unit for detecting a displacement of the slider; an stylus tip displacement detector unit for detecting a displacement of the stylus tip of the scanning probe with respect to the end of the slider; and an arithmetic unit for calculating a measured value from the displacement of the slider detected by the scale unit and from the displacement of the stylus tip detected by the stylus tip displacement detector unit; the method of measuring surface texture comprising a step of finding a presumed value of design value of the object to be measured from the displacement of the slider detected by the scale unit and finding a presumed kinetic error by subtracting the presumed value of the design value from the displacement of the slider, and calculating the measured value by adding up together a corrected value of the presumed kinetic error found by applying a correction filter based on a relative displacement characteristics between the scale unit and the end of the slider to the presumed kinetic error, the presumed value and the displacement of the stylus tip.

A first computer readable medium having a program for measuring surface texture according to the invention is a computer readable medium having a program for measuring surface texture including instructions for permitting a computer to execute the measurement of an object that is to be measured by using a measuring apparatus which comprises a scanning probe having, at an end thereof, an stylus tip that comes in contact with an object to be measured to take a measurement by scanning; a slider which is allowed to freely move supporting the scanning probe at an end thereof; a scale unit for detecting a displacement of the slider; an stylus tip displacement detector unit for detecting a displacement of the stylus tip of the scanning probe with respect to the end of the slider; and an arithmetic unit for calculating a measured value from the displacement of the slider detected by the scale unit and from the displacement of the stylus tip detected by the stylus tip displacement detector unit, the instructions comprising: calculating the measured value by adding up together the displacement of the stylus tip and a presumed value of displacement of the end of the slider found by applying a correction filter based on a relative displacement characteristics between the scale unit and the end of the slider to the displacement of the slider detected by the scale unit.

A second computer readable medium having a program for measuring surface texture according to the invention is a computer readable medium having a program for measuring surface texture including instructions for permitting a computer to execute the measurement of an object that is to be measured by using a measuring apparatus which comprises a scanning probe having, at an end thereof, an stylus tip that comes in contact with an object to be measured to take a measurement by scanning; a slider which is allowed to freely move supporting the scanning probe at an end thereof; a scale unit for detecting a displacement of the slider; an stylus tip displacement detector unit for detecting a displacement of the stylus tip of the scanning probe with respect to the end of the slider; and an arithmetic unit for calculating a measured value from the displacement of the slider detected by the scale unit and from the displacement of the stylus tip detected by the stylus tip displacement detector unit, the instructions comprising: finding a kinetic error by subtracting a design value of the object to be measured from the displacement of the slider detected by the scale unit and calculating the measured value by adding up together a corrected value of the kinetic error found by applying a correction filter based on a relative displacement characteristics between the scale unit and the end of the slider to the kinetic error, the design value and the displacement of the stylus tip.

A third computer readable medium having a program for measuring surface texture according to the invention is a computer readable medium having a program for measuring surface texture including instructions for permitting a computer to execute the measurement of an object that is to be measured by using a measuring apparatus which comprises a scanning probe having, at an end thereof, an stylus tip that comes in contact with an object to be measured to take a measurement by scanning; a slider which is allowed to freely move supporting the scanning probe at an end thereof; a scale unit for detecting a displacement of the slider; an stylus tip displacement detector unit for detecting a displacement of the stylus tip of the scanning probe with respect to the end of the slider; and an arithmetic unit for calculating a measured value from the displacement of the slider detected by the scale unit and from the displacement of the stylus tip detected by the stylus tip displacement detector unit, the instructions comprising: finding a presumed value of design value of the object to be measured from the displacement of the slider detected by the scale unit and finding a presumed kinetic error by subtracting the presumed value of the design value from the displacement of the slider, and calculating the measured value by adding up together a corrected value of the presumed kinetic error found by applying a correction filter based on a relative displacement characteristics between the scale unit and the end of the slider to the presumed kinetic error, the presumed value and the displacement of the stylus tip.

According to the present invention, the arithmetic unit calculates the measured value based on the relative displacement characteristics between the scale unit and the end of the slider output through the correction filter. Therefore, there are provided a measuring apparatus capable of highly precisely measuring an object to be measured by decreasing errors in the displacement from the scale unit up to the end of the slider, a method of measuring surface texture and a computer readable medium having a program for measuring surface texture.

Other features and advantages may be apparent from the following detailed description, the accompanying drawings and the claims.

DETAILED DESCRIPTION

A three-dimensional measuring apparatus according to an embodiment of the invention will now be described with reference to the drawings.

First Embodiment

Figure 1:
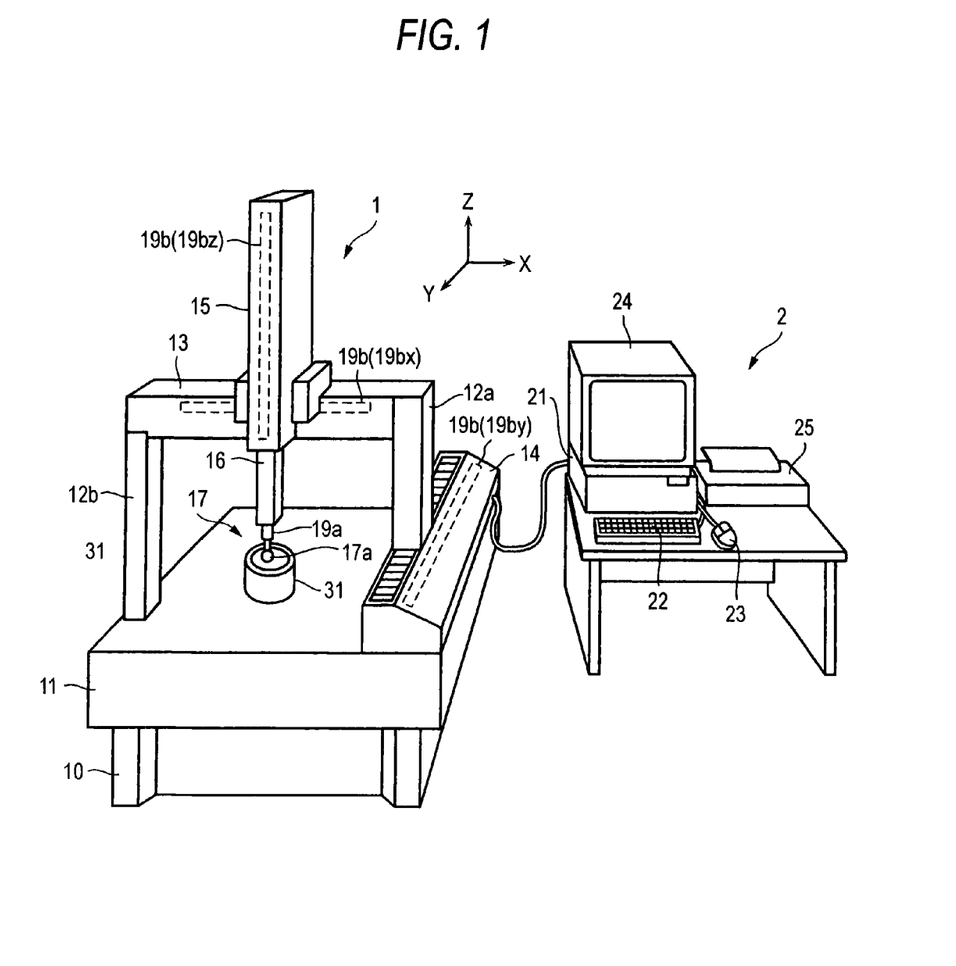
FIG. 1 is a view schematically illustrating a three-dimensional measuring apparatus according to a first embodiment of the invention.

FIG. 1 is a perspective view schematically illustrating the constitution of a three-dimensional measuring apparatus according to a first embodiment of the present invention. The three-dimensional measuring apparatus comprises a three-dimensional measuring machine 1, and a computer 2. The computer 2 drives and controls the three-dimensional measuring machine 1 to take necessary measured values and executes an arithmetic processing necessary for calculating surface texture of the object to be measured.

The three-dimensional measuring machine 1 is constituted as shown, for example, in FIG. 1. A surface plate 11 is placed on a vibration-free plate 10 in a manner that the upper surface of the surface plate 11 serves as a base surface which is in agreement with a horizontal surface. A beam 13 extending in the X-axis direction is supported at the upper ends of beam support members 12a and 12b erected on both end sides of the surface plate 11. The beam support member 12a has its lower end driven in the Y-axis direction by a Y-axis drive mechanism 14. The beam support member 12b has its lower end supported by the surface plate 11 so as to move in the Y-axis direction due to an air bearing. The beam 13 supports a column 15 that extends in the vertical direction (Z-axis direction). The column 15 is driven in the X-axis direction along the beam 13. The column 15 is provided with a slider 16 which is driven in the Z-axis direction along the column 15. A contact type scanning probe 17 is attached to the lower end of the slider 16. A stylus tip 17a of, for example, a spherical shape is provided at an end of the scanning probe 17. When the stylus tip 17a comes in contact with an object 31 to be measured placed on the surface plate 11 and then the stylus tip 17a is shifted from a reference position (neutral position) thereof, an stylus tip displacement detector unit 19a incorporated in the scanning probe 17 produces shifting amounts (directions of X-, Y- and Z-axes), and X-, Y- and Z-coordinate values (shifting amounts of the reference position) of the stylus tip 17a are received by the computer 2.

The computer includes a computer body 21, a keyboard 22, a mouse 23, a CRT 24 and a printer 25.

Figure 2:
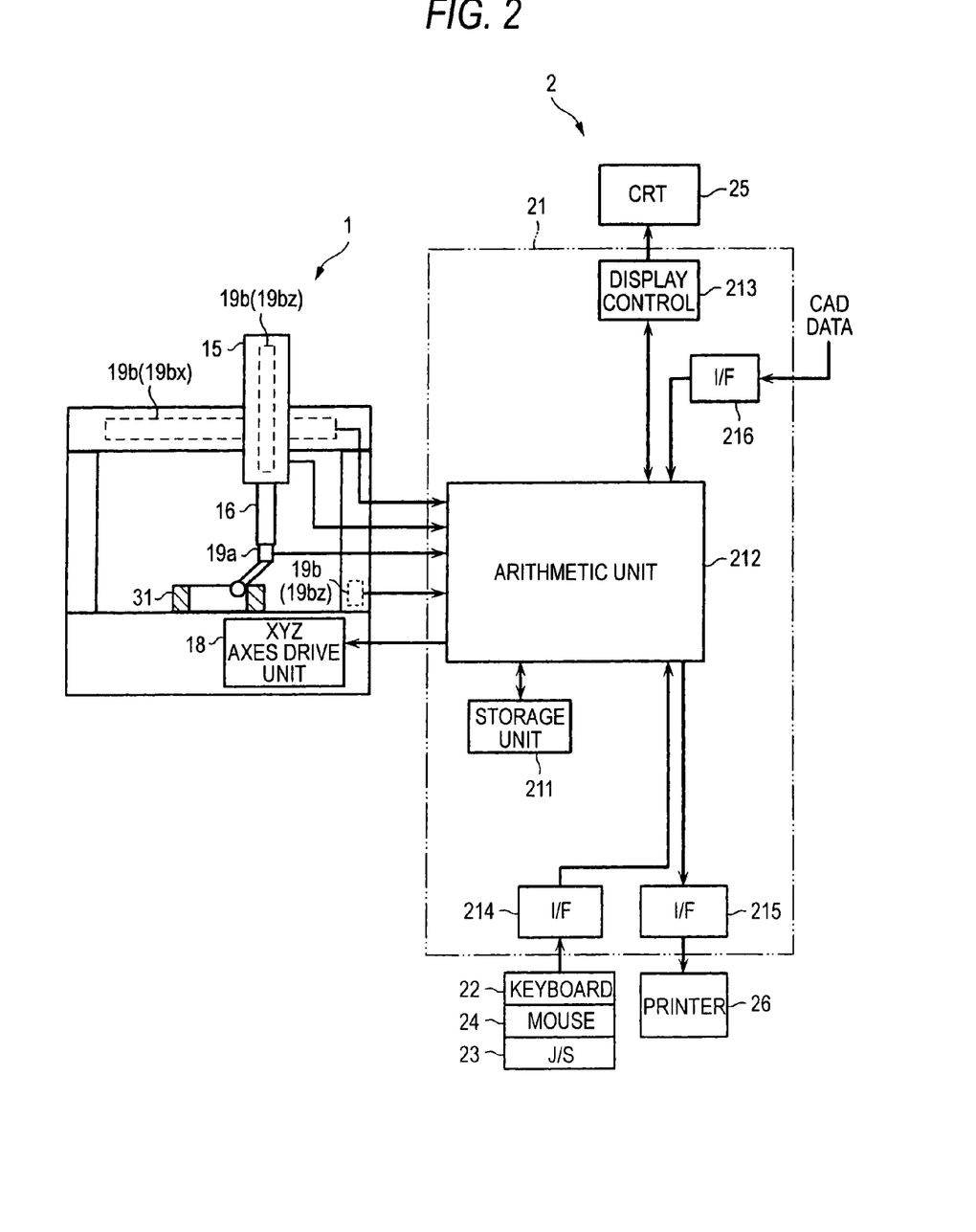
FIG. 2 is a functional block diagram of the three-dimensional measuring apparatus according to the first embodiment of the invention.

Next, the functional constitution of the three-dimensional measuring apparatus will be described with reference to FIG. 2 which is a functional block diagram of the three-dimensional measuring apparatus.

The three-dimensional measuring machine 1 incorporates an X-, Y- and Z-axes drive unit 18 and a scale unit 19b. The X-, Y- and Z-axes drive unit 18 drives the probe 17 in the X-, Y- and Z-axes directions. The scale unit 19b produces motion pulses of the slider 16 in the directions of these axes accompanying the motion in the X-, Y- and Z-axes directions. The scale unit 19b includes a Y-axis scale unit 19by, an X-axis scale unit 19bx, and a Z-axis scale unit 19bz. The Y-axis scale unit 19by is disposed near the Y-axis drive mechanism 14 and detects the displacement of the beam support member 12a in the Y-axis direction. The X-axis scale unit 19bx is disposed on the beam 13 and detects the displacement of the column 15 in the X-axis direction. The Z-axis scale unit 19bz is disposed on the column 15 and detects the displacement of the slider 16 in the Z-axis direction. Displacement data of the stylus tip 17a and the slider 16 that are detected (X, Y- and Z-axes shifting amounts output from the stylus tip displacement detector unit 19a, and displacements in the directions of these axes output from the scale unit 19b) are output to an arithmetic unit 212 that will be described later.

The computer body 21 of the computer includes a storage unit 211, an arithmetic unit 212, a display control unit 213, and I/Fs (interfaces) 214 to 216. The storage unit 211 is constituted by, for example, an HDD or a semiconductor memory, and stores the data. The arithmetic unit 212 is realized by CPU, etc., and drives the three-dimensional measuring machine 1 and calculates the measured values. The display control unit 213 controls the image displayed on a CRT 25. The storage unit 211 stores a program for measuring surface texture by driving the three-dimensional measuring machine 1, detected values obtained by the measurement, and design values of the object to be measured. The arithmetic unit 212 reads the program for measuring surface texture from the storage unit 211, and measures the shape of the object to be measured.

The arithmetic unit 212 receives instruction data of an operator input from the keyboard 22, joy stick 23 and mouse 24 through the I/F 214. The arithmetic unit 212 further receives stylus tip displacement data and slider displacement data that are detected. Based upon the input data, instruction data of the operator and the program stored in the storage unit 211, the arithmetic unit 212 executes various processings such as moving the slider 16 by the X-, Y- and Z-axes drive unit 18, analysis of image of the work 31 and correction of the measured values. The arithmetic unit 212 produces the measured values calculated by various processings to a printer 26 through the interface 215. The interface 216 is for converting CAD data of a work 12 provided from an external CAD system that is not shown into a predetermined form so as to be input to the computer system 21.

Figure 3:
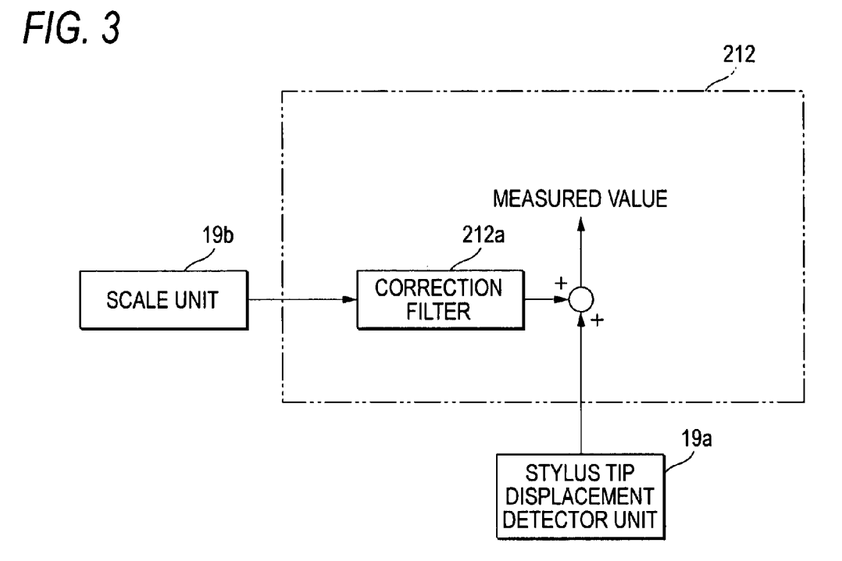
FIG. 3 is a control block diagram of the three-dimensional measuring apparatus according to the first embodiment of the invention.
Figure 4:
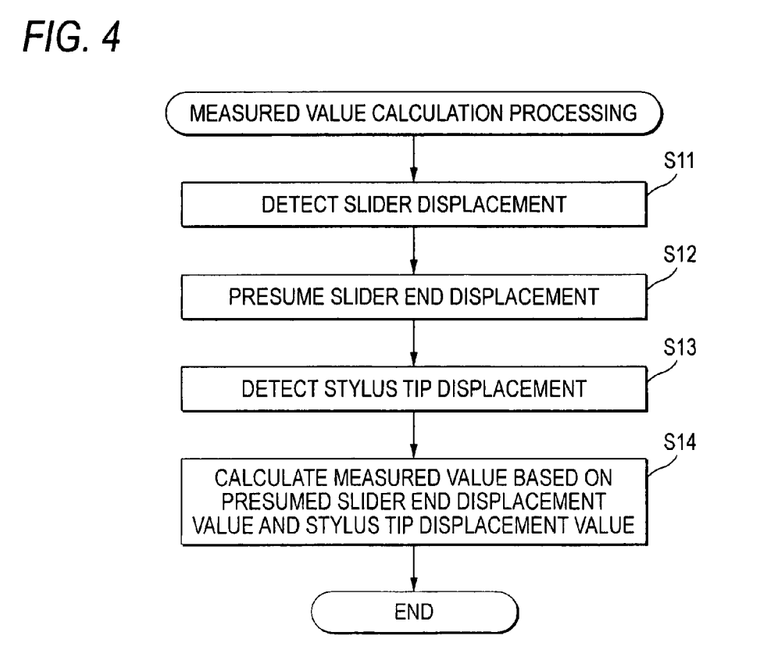
FIG. 4 is a flowchart of a measured value calculation processing of the three-dimensional measuring apparatus according to the first embodiment of the invention.

Next, described with reference to FIGS. 3 and 4 are the functional constitution of the arithmetic unit 212 for calculating the measured values of the object 31 to be measured and a step of calculating the measured values. FIG. 3 is a control block diagram of the three-dimensional measuring apparatus realized by the arithmetic unit 212 and the peripheral equipment thereof. FIG. 4 is a flowchart illustrating a measured value calculation processing for calculating the measured values.

First, the scale unit 19b detects the displacement of the slider 16 (step S11) and inputs the displacement to the arithmetic unit 212. The arithmetic unit 212 calculates, through the correction filter 212a, a presumed value of slider end displacement which is a displacement (coordinate) of the end of the slider 16 in a space being measured based on the displacement of the slider 16 that is input (step S12).

Through the correction filter 212a, for example, the arithmetic unit 212 uses, as a corrected value, a presumed value $G_e$ (S) that is set to be approximate to the frequency transfer function $G_R$ UP to the end of the slider 16 based on the measured displacement of the scale unit 19b. The presumed value $G_e$ (S) is expressed, for example, by the following formula 1.

[Mathematical 2]

$$G_e = [\omega^2_P(S^2 + 2\xi_Z\omega_Z S + \omega^2_Z)] / [\omega^2_Z(S^2 + 2\xi_P\omega_P S + \omega^2_P)] \quad (1)$$

where $G_e$: presumed value of a frequency transfer function,
S: Laplace operator,
$\omega_Z$: angular frequency at the zero,
$\omega_P$: angular frequency at the pole,
$\xi_Z$: attenuation factor at the zero,
$\xi_P$: attenuation factor at the pole.

Next, the stylus tip displacement detector unit 19a detects a stylus tip displacement value that represents the displacement of the stylus tip 17a (shifting amount from the reference position of the stylus tip 17a) relative to the end of the slider 16 (step S13), and inputs it to the arithmetic unit 212. Based on the presumed value of slider end displacement and the stylus tip displacement value, the arithmetic unit 212 calculates the measured value and outputs it (step S14).

The frequency transfer characteristics of the correction filter 212a can be found, for example, in a manner as described below.

A work such as a gauge block is placed on the surface plate 11 of the three-dimensional measuring machine 1. Here, the X-, Y- and Z-axes directions of the three-dimensional measuring machine are set to be in agreement with the surface directions of the work.

Next, the slider 16 is moved in the Y-axis direction so that the stylus tip 17a of the scanning probe 17 comes in contact with the XZ-surface of the work so as to be depressed therein by a predetermined amount (the stylus tip 17a is shifted in the Y-axis direction by a predetermined amount). Thereafter, an instruction is given to the Y-axis drive mechanism 14 so that the slider 16 of the three-dimensional measuring machine 1 reciprocally moves in the Y-axis direction for a predetermined period of time. At this moment, amplitudes between the X-, Y- and Z-axes shifting amounts output from the stylus tip displacement detector unit 19a and the displacements in these axial directions output from the scale unit 19b, and phases thereof are recorded. It is desired that the reciprocal motion is, usually, carried out in the form of a sinusoidal wave.

Next, the amplitudes and phases are similarly recorded in different times of reciprocal motion (reciprocating period: or reciprocating frequency).

The frequency transfer function from the Y-axis scale unit 19by up to the end of the slider 16 can be found from the thus found data of amplitudes and phases at each of the periods (at each of the frequencies).

Concerning the X-axis and Z-axis, too, instructions are given to the X-axis drive mechanism and to the Z-axis drive mechanism to similarly find the frequency transfer functions.

The frequency transfer characteristics from the Y-axis scale unit 9by up to the end of the slider 16, the frequency transfer characteristics from the X-axis scale unit 9bx up to the end of the slider 16 and the frequency transfer characteristics from the Z-axis scale unit 9bz up to the end of the slider 16, are not necessary in agreement with each other. Therefore, the transfer functions, usually, become different from each other.

Further, the transfer functions often differ depending upon the positions of the beam support members 12a and 12b of the three-dimensional measuring machine 1 (e.g., front side, central portion or back side in FIG. 1).

In such a case, the transfer functions are found for each of the positions in the X-, Y- and Z-axes directions of the slider 16, and the transfer functions corresponding to the positions in the X-, Y- and Z-axes directions of the slider are used to further improve precision of the correction filter 212a.

The example that uses the correction filter 212a has a prerequisite in that when a reciprocation instruction is given to the Y-axis drive mechanism 14, the stylus tip displacement detector unit 19a produces the Y-axis component only, and there is no change in the components of other axes (X- and Z-axes). In practice, however, changes often occur in the X- and Z-axes components even when a reciprocation instruction is given concerning the Y-axis only. That is, when the beam support members 12a and 12b are vibrated in the Y-axis direction (forward/backward direction in FIG. 1), the stylus tip 17a of the scanning probe 17 often vibrates in the X-axis direction or in the Z-axis direction. When vibration occurs in the directions of different axes, the transfer functions are found based on the components thereof, and the displacement at the end of the slider 16 is more correctly presumed by the correction filter 212a. At the time of finding components of different axes, it is desired that the stylus tip 17a of the scanning probe 17 is not only so brought into contact as to be pushed in the Y-axis direction of the work by a predetermined amount but also that the stylus tip 17a is locked in the X-axis direction and in the Z-axis direction. For example, the stylus tip 17a may be fixed onto the surface plate 11 by using a rotary joint which has no freedom in the X-, Y- and Z-directions but has freedom in the rotational directions about these axes.

Thus, the transfer functions are found for each of the positions on the axes of the slider 16 and, further, based on the vibrations of different axes, and are set to the correction filter 212a in order to more correctly presume the displacement at the end of the slider 16.

As described above, the three-dimensional measuring apparatus according to the first embodiment of the present invention calculates the measured value by using the correction filter 212a to which are set the transfer functions found from the frequency transfer characteristics (relative displacement characteristics) of from the scale unit 19b up to the end of the slider 16. Thus, the position at the end of the slider 16 is found more correctly than when the position of the scale unit (position of the scale unit=presumed to be the position at the end of the slider) is fused in the related art. The position of the end of the slider 16 after corrected and the position of the stylus tip 17a are added up together to find a measured value canceling the effects caused by quadrant projection, lost motion, transient phenomenon and resonance phenomenon, and makes it possible to measure an object to be measured, such as a ring gauge maintaining high precision.

Second Embodiment

Figure 5:
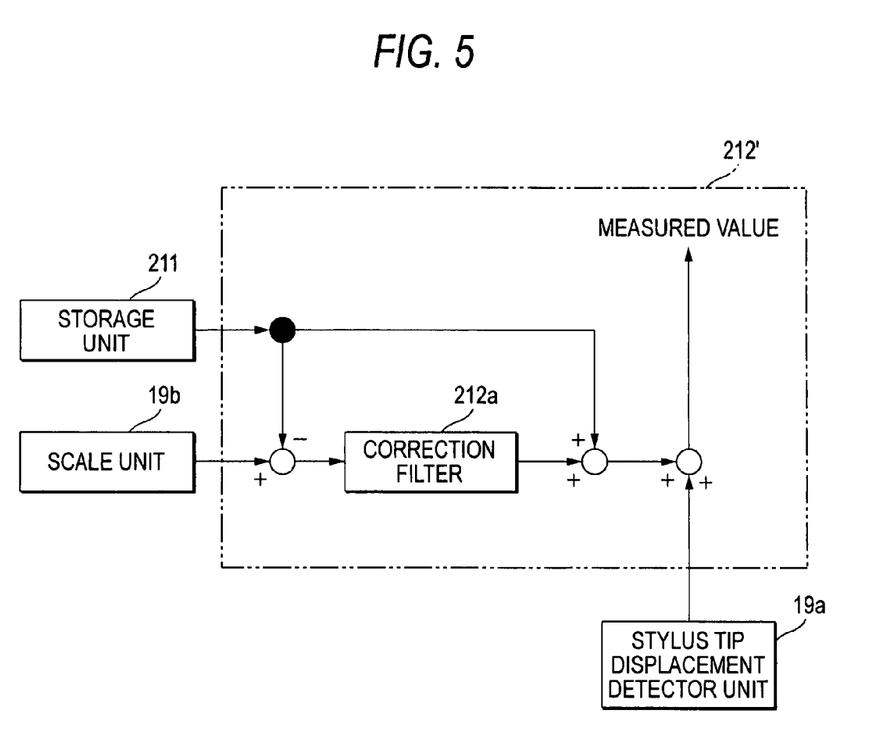
FIG. 5 is a control block diagram of the three-dimensional measuring apparatus according to a second embodiment of the invention.
Figure 6:
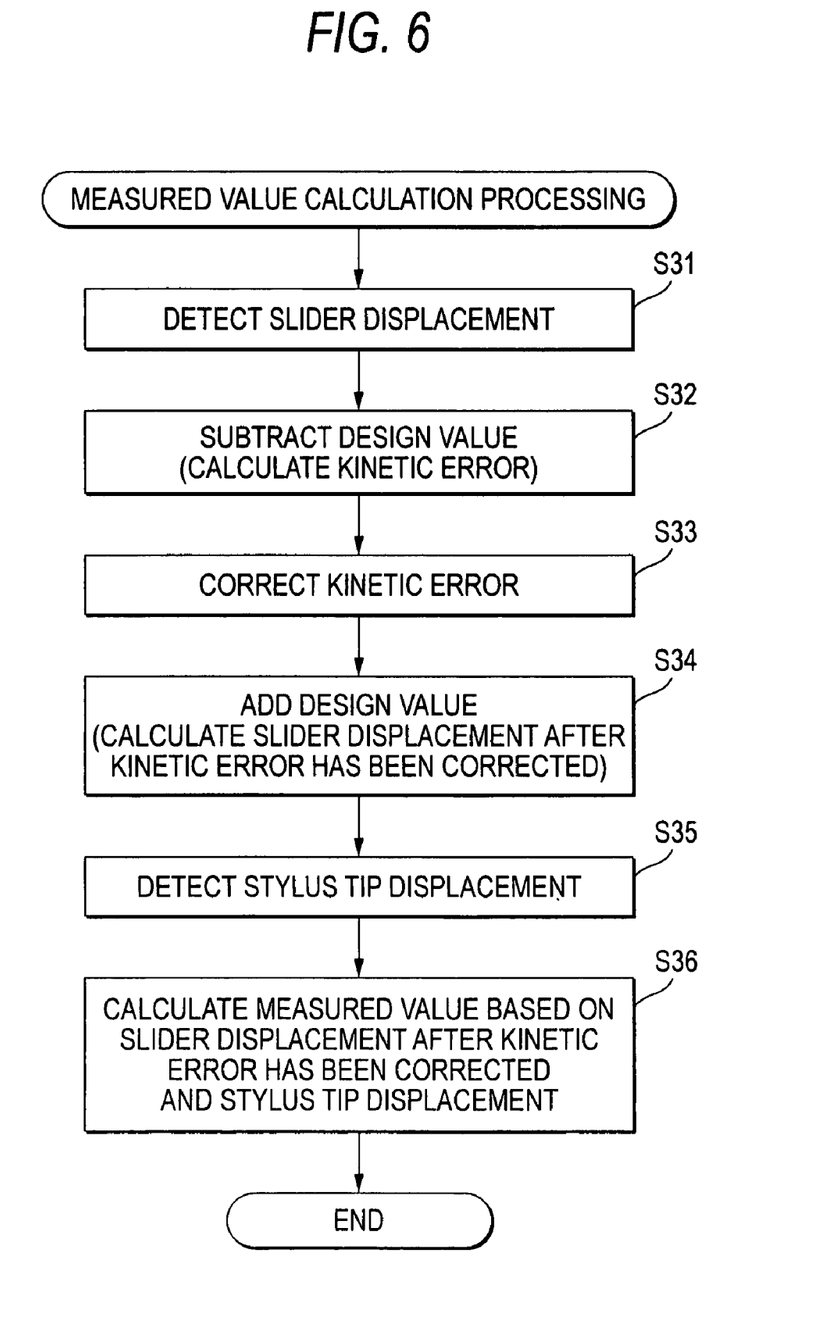
FIG. 6 is a flowchart of a measured value calculation processing of the three-dimensional measuring apparatus according to the second embodiment of the invention.
Figure 7:
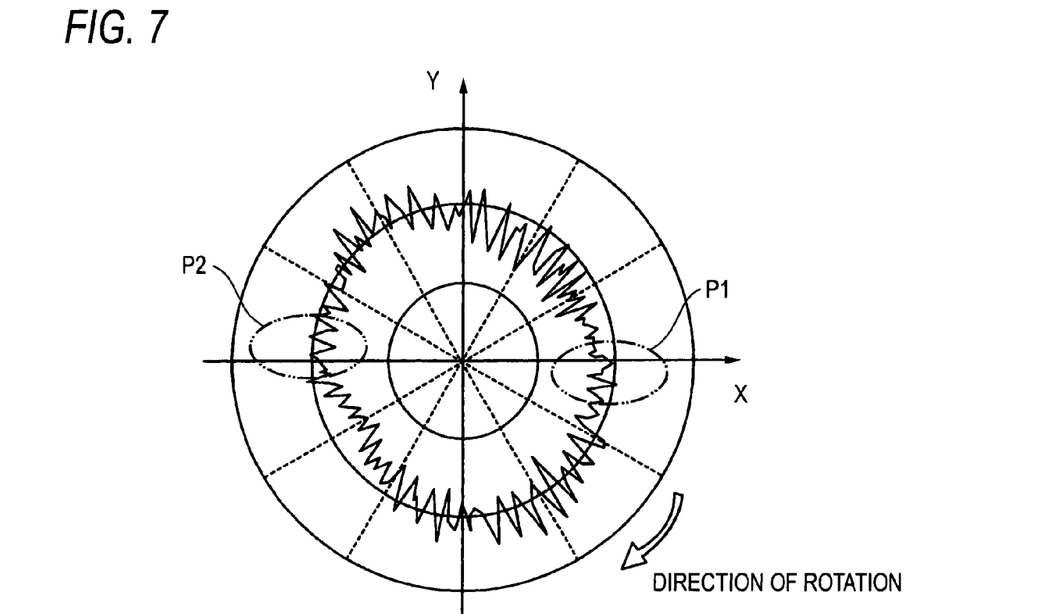
FIG. 7 is a diagram illustrating the simulated results of measured values of an object to be measured in the case of using the three-dimensional measuring apparatus according to the second embodiment of the invention.

Next, the three-dimensional measuring apparatus according to a second embodiment of the invention will be described with reference to FIGS. 5 to 7. The three-dimensional measuring apparatus according to the second embodiment is different from that of the first embodiment with respect to executing the arithmetic operation using the arithmetic unit 212 only. Therefore, the same constitutions as those of the first embodiment are denoted by the same reference numerals but their description is omitted. FIG. 5 is a control block diagram using the arithmetic unit 212' in the three-dimensional measuring apparatus according to the second embodiment of the invention. FIG. 6 is a flowchart illustrating a measured value calculation processing. FIG. 7 is a diagram illustrating the simulated results of measured values of an object 31 to be measured of when the embodiment is applied.

Referring to FIGS. 5 and 6, the scale portion 19b, first, detects the displacement of the slider 16 (step S31) and outputs it to the arithmetic unit 212' like in the first embodiment. Next, the arithmetic unit 212' reads a design value which is the shape data of the object 31 to be measured stored in advance in the storage unit 211, and subtracts the design value from the displacement of the slider 16 that is input to calculate a kinetic error (step S32). Thereafter, the arithmetic unit 212' executes through the correction filter 212a a processing for correcting the effect of the kinetic error on the position at the end of the slider 16 to thereby presume a positional error at the end of the slider 16 (step S33). Next, the arithmetic unit 212' adds the design value read from the storage unit 211 to the kinetic error of the slider 16 that is corrected to calculate the displacement of the slider after the kinetic error has been corrected (step S34). The stylus tip displacement detector unit 19a detects the displacement data of the stylus tip 17a relative to the end of the slider 16 (step S35), and calculates the measured value based on the displacement data of the stylus tip 17*a* and the displacement of the slider 16 after the kinetic error has been corrected (step S36).

Referring to the simulated results of measured values using the three-dimensional measuring apparatus according to the second embodiment of the invention as shown in FIG. 7, it will be learned that projection-like measuring errors have been removed from the boundary region P1 between the fourth quadrant and the first quadrant and from the boundary region P2 between the second quadrant and the third quadrant as compared to FIG. 8 which illustrates a related-art example.

As described above, the three-dimensional measuring apparatus according to the second embodiment is of a constitution in which the correction filter 212*a* is applied to the kinetic locus error (value obtained by subtracting the design value from the position data of the slider 16: kinetic error).

Here, when a general measurement is to be taken, e.g., when a ring gauge of φ 100 mm is to be measured, the kinetic locus error is about several hundred μm with respect to the design value of 100 mm, and these values are different by an order of $10^3$. On the other hand, the single-precision floating-point arithmetic precision of the arithmetic unit 212' for realizing the correction filter 212*a* is, usually, about $10^7$ ($1.7 \times 10^7 \approx 24$ bits). As described above, the kinetic locus error for the design value is very small. Upon separately operating a numerical value region due to the error, therefore, it is allowed to effectively utilize the dynamic range of operation of the correction filter 212*a*. As a result, a more highly precise correction is realized.

MODIFIED EMBODIMENT

In the second embodiment, the design value was read from the storage unit 211 and was subtracted from the measured position of the slider 16 to find a kinetic error. It is, however, also allowable to employ other constitutions. For example, a presumed design value of the object to be measured is calculated by the method of least squares relying upon the data of measured position of the slider 16, the presumed value is subtracted from the measured position data of the slider 16 to find a presumed kinetic error, the presumed kinetic error is passed through the correction filter 212*a* to find a corrected value of the presumed kinetic error, and the corrected value, presumed design value and displacement of the stylus tip are added up together to calculate the measured value. According to this modified embodiment, the design value does not have to be held in the memory unit 211. Therefore, the invention can be put into practice even for the object to be measured of which the design value has not been known.

In the second embodiment or the modified embodiment, too, the transfer functions may be found for each of the positions in the X-, Y and Z-axes directions of the slider 16, and the transfer functions corresponding to the positions in the X-, Y- and Z-axes directions of the slider may be used to further improve the precision of the correction filter 212*a* like in the first embodiment.

In selecting the transfer functions, further, the transfer functions may be selected for each of the predetermined positions on the separate X-, Y- and Z-axes, or may be selected for each of the three-dimensional space positions determined by predetermined positions on the X-, Y- and Z-axes.

The above embodiments have described the case of scanning a circle. However, the invention is not limited thereto only but can also be applied to scanning, for example, free curved surfaces.

Further, the measurement by scanning of the invention can be carried out even in the design value measurement by scanning that follows a predetermined locus (design value) or in the autonomous measurement by scanning (measurement by scanning in which the measuring machine successively presumes the surface shape of the object to be measured).

Though the above embodiments have described the three-dimensional measuring apparatus only, it needs not be pointed out that the invention can similarly be put into practice with various kinds of measuring apparatuses such as image measuring apparatus, contour measuring apparatus, circularity degree measuring apparatus, surface roughness measuring apparatus and the like apparatus.

Further, though the above embodiments have described measuring the coordinates and shapes only, it needs not be pointed out that the invention can similarly be put into practice in the measurement of circularity degree, in the measurement of contour and in the measurement of surface texture such as roughness/swelling. The invention can similarly be put into practice with a program for measuring surface texture.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A measuring apparatus comprising:
   a scanning probe having, at an end thereof, a stylus tip that comes in contact with an object to be measured to take a measurement by scanning;
   a slider which is allowed to freely move supporting the scanning probe at an end thereof;
   a scale unit for detecting a displacement of the slider;
   an stylus tip displacement detector unit for detecting a displacement of the stylus tip of the scanning probe with respect to the end of the slider; and
   an arithmetic unit, which has a correction filter based on a relative displacement characteristics between the scale unit and the end of the slider, for calculating a measured value based on a value found by applying the correction filter to the displacement of the slider detected by the scale unit and on the displacement of the stylus tip detected by the stylus tip displacement detector unit.

2. The measuring apparatus according to claim 1, wherein the arithmetic unit calculates the measured value by adding up together the displacement of the stylus tip and a presumed value of displacement of the end of the slider found by applying the correction filter to the displacement of the slider detected by the scale unit.

3. The measuring apparatus according to claim 1, wherein the arithmetic unit finds a kinetic error by subtracting a design value of the object to be measured from the displacement of the slider detected by the scale unit and calculates the measured value by adding up together a corrected value of the kinetic error found by applying the correction filter to the kinetic error, the design value and the displacement of the stylus tip.

4. The measuring apparatus according to claim 1, wherein the arithmetic unit finds a presumed value of design value of the object to be measured from the displacement of the slider detected by the scale unit and finds a presumed kinetic error by subtracting the presumed value of the design value from the displacement of the slider, and calculates the measured value by adding up together a corrected value of the presumed kinetic error found by applying the correction filter to the presumed kinetic error, the presumed value and the displacement of the stylus tip.

5. The measuring apparatus according to claim 1, wherein the correction filter corrects an input value based on a presumed value of frequency transfer characteristics of from the scale unit up to the end of the slider.

6. The measuring apparatus according to claim 5, wherein the frequency transfer characteristics are expressed by a transfer function determined for each position of the slider, and the presumed value of the frequency transfer characteristics is calculated based on the transfer function determined for each position of the slider.

7. The measuring apparatus according to claim 6, wherein the correction filter uses, $$G_e = [\omega^2_P(S^2 + 2\xi_Z\omega_Z S + \omega^2_Z)] / [\omega^2_Z(S^2 + 2\xi_P\omega_P S + \omega^2_P)]$$

where $G_e$: presumed value of a frequency transfer function,
S: Laplace operator,
$\omega_Z$: angular frequency at the zero,
$\omega_P$: angular frequency at the pole,
$\xi_Z$: attenuation factor at the zero,
$\xi_P$: attenuation factor at the pole,
as an approximate function of the transfer function that represents the frequency transfer characteristics, applies it to the frequency transfer function that is measured, and outputs the approximate function as the presumed value of the frequency transfer characteristics.

8. The measuring apparatus according to claim 5, wherein the correction filter uses, $$G_e = [\omega^2_P(S^2 + 2\xi_Z\omega_Z S + \omega^2_Z)] / [\omega^2_Z(S^2 + 2\xi_P\omega_P S + \omega^2_P)]$$

where $G_e$: presumed value of a frequency transfer function,
S: Laplace operator,
$\omega_Z$: angular frequency at the zero,
$\omega_P$: angular frequency at the pole,
$\xi_Z$: attenuation factor at the zero,
$\xi_P$: attenuation factor at the pole,
as an approximate function of the transfer function that represents the frequency transfer characteristics, applies it to the frequency transfer function that is measured, and outputs the approximate function as the presumed value of the frequency transfer characteristics.

9. A method of measuring surface texture to measure an object that is to be measured by using a measuring apparatus which comprises a scanning probe having, at an end thereof, an stylus tip that comes in contact with an object to be measured to take a measurement by scanning, a slider which is allowed to freely move supporting the scanning probe at an end thereof, a scale unit for detecting a displacement of the slider, and an stylus tip displacement detector unit for detecting a displacement of the stylus tip of the scanning probe with respect to the end of the slider, the method comprising steps of:
  detecting the displacement of the slider by the scale unit;
  detecting the displacement of the stylus tip of the scanning probe with respect to the end of the slider by the stylus tip displacement detector unit; and
  calculating a measured value based on a value found by applying a correction filter based on a relative displacement characteristics between the scale unit and the end of the slider to the displacement of the slider detected by the scale unit and on the displacement of the stylus tip detected by the stylus tip displacement detector unit.

10. The method according to claim 9, wherein the measured value calculating step includes a step of calculating the measured value by adding up together the displacement of the stylus tip and a presumed value of displacement of the end of the slider found by applying the correction filter to the displacement of the slider detected by the scale unit.

11. The method according to claim 9, wherein the measured value calculating step includes a step of finding a kinetic error by subtracting a design value of the object to be measured from the displacement of the slider detected by the scale unit, and a step of calculating the measured value by adding up together a corrected value of the kinetic error found by applying the correction filter to the kinetic error, the design value and the displacement of the stylus tip.

12. The method according to claim 9, wherein the measured value calculating step includes a step of finding a presumed value of design value of the object to be measured from the displacement of the slider detected by the scale unit and finding a presumed kinetic error by subtracting the presumed value of the design value from the displacement of the slider, and a step of calculating the measured value by adding up together a corrected value of the presumed kinetic error found by applying the correction filter to the presumed kinetic error, the presumed value and the displacement of the stylus tip.

13. A computer readable medium having a program for measuring surface texture including instructions for permitting a computer to execute a measurement of an object that is to be measured by using a measuring apparatus which comprises a scanning probe having, at an end thereof, an stylus tip that comes in contact with an object to be measured to take a measurement by scanning, a slider which is allowed to freely move supporting the scanning probe at an end thereof, a scale unit for detecting a displacement of the slider, and an stylus tip displacement detector unit for detecting a displacement of the stylus tip of the scanning probe with respect to the end of the slider, the instructions comprising steps of:
  detecting the displacement of the slider by the scale unit;
  detecting the displacement of the stylus tip of the scanning probe with respect to the end of the slider by the stylus tip displacement detector unit; and
  calculating a measured value based on a value found by applying a correction filter based on a relative displacement characteristics between the scale unit and the end of the slider to the displacement of the slider detected by the scale unit and on the displacement of the stylus tip detected by the stylus tip displacement detector unit.

14. The computer readable medium according to claim 13, wherein the measured value calculating step includes a step of calculating the measured value by adding up together the displacement of the stylus tip and a presumed value of displacement of the end of the slider found by applying the correction filter to the displacement of the slider detected by the scale unit.

15. The computer readable medium according to claim 13, wherein the measured value calculating step includes a step of finding a kinetic error by subtracting a design value of the object to be measured from the displacement of the slider detected by the scale unit, and a step of calculating the measured value by adding up together a corrected value of the kinetic error found by applying the correction filter to the kinetic error, the design value and the displacement of the stylus tip.

16. The computer readable medium according to claim 13, wherein the measured value calculating step includes a step of finding a presumed value of design value of the object to be measured from the displacement of the slider detected by the scale unit and finding a presumed kinetic error by subtracting the presumed value of the design value from the displacement of the slider, and a step of calculating the measured value by adding up together a corrected value of the presumed kinetic error found by applying the correction filter to the presumed kinetic error, the presumed value and the displacement of the stylus tip.

* * * * *